(12) United States Patent
Sales Casals et al.

(10) Patent No.: US 8,244,087 B2
(45) Date of Patent: Aug. 14, 2012

(54) HYBRID CABLE

(75) Inventors: Lluis-Ramon Sales Casals, Barcelona (ES); Josep Maria Batlle Ferrer, Barcelona (ES); Carles Escofet Roig, Barcelona (ES); Jose Maria Martin Regalado, Barcelona (ES); Marcelino Navarro Gimeno, Barcelona (ES); Joan Baptista Rovira I Pascual, Barcelona (ES)

(73) Assignee: Prysmian Cables y Sistemas S.L., Barcelona (ES)

( * ) Notice: Subject to any disclaimer, the term of this patent is extended or adjusted under 35 U.S.C. 154(b) by 76 days.

(21) Appl. No.: 12/738,545

(22) PCT Filed: Oct. 18, 2007

(86) PCT No.: PCT/IB2007/003280
§ 371 (c)(1),
(2), (4) Date: Aug. 27, 2010

(87) PCT Pub. No.: WO2009/050533
PCT Pub. Date: Apr. 23, 2009

(65) Prior Publication Data
US 2010/0316340 A1    Dec. 16, 2010

(51) Int. Cl.
*G02B 6/44*    (2006.01)

(52) U.S. Cl. ........................................ 385/101

(58) Field of Classification Search .................. 385/101
See application file for complete search history.

(56) References Cited

U.S. PATENT DOCUMENTS

| 4,365,865 A | 12/1982 | Stiles |
| 4,552,432 A * | 11/1985 | Anderson et al. ............. 385/101 |
| 4,852,965 A | 8/1989 | Mullin et al. |
| 5,268,971 A | 12/1993 | Nilsson et al. |

FOREIGN PATENT DOCUMENTS

| EP | 0 203 249 | 12/1986 |
| WO | WO-88/06742 | 9/1988 |
| WO | WO-2005/114285 A1 | 12/2005 |

OTHER PUBLICATIONS

International Search Report from the European Patent Office for International Application No. PCT/IB2007/003280 (Jun. 27, 2008).

* cited by examiner

*Primary Examiner* — Daniel Petkovsek
(74) *Attorney, Agent, or Firm* — Finnegan, Henderson, Farabow, Garrett & Dunner, L.L.P.

(57) ABSTRACT

A hybrid cable includes a plurality of conductor wires, at least one optical fiber unit and an insulation jacket surrounding the electrical conductors and the optical fiber unit. The at least one optical fiber unit is dispersed in a number of the electrical conductors which is at least 12 times the number of the optical fiber units, the diameter of the optical fiber unit being substantially equal to or greater than the diameter of the electrical conductors.

13 Claims, 1 Drawing Sheet

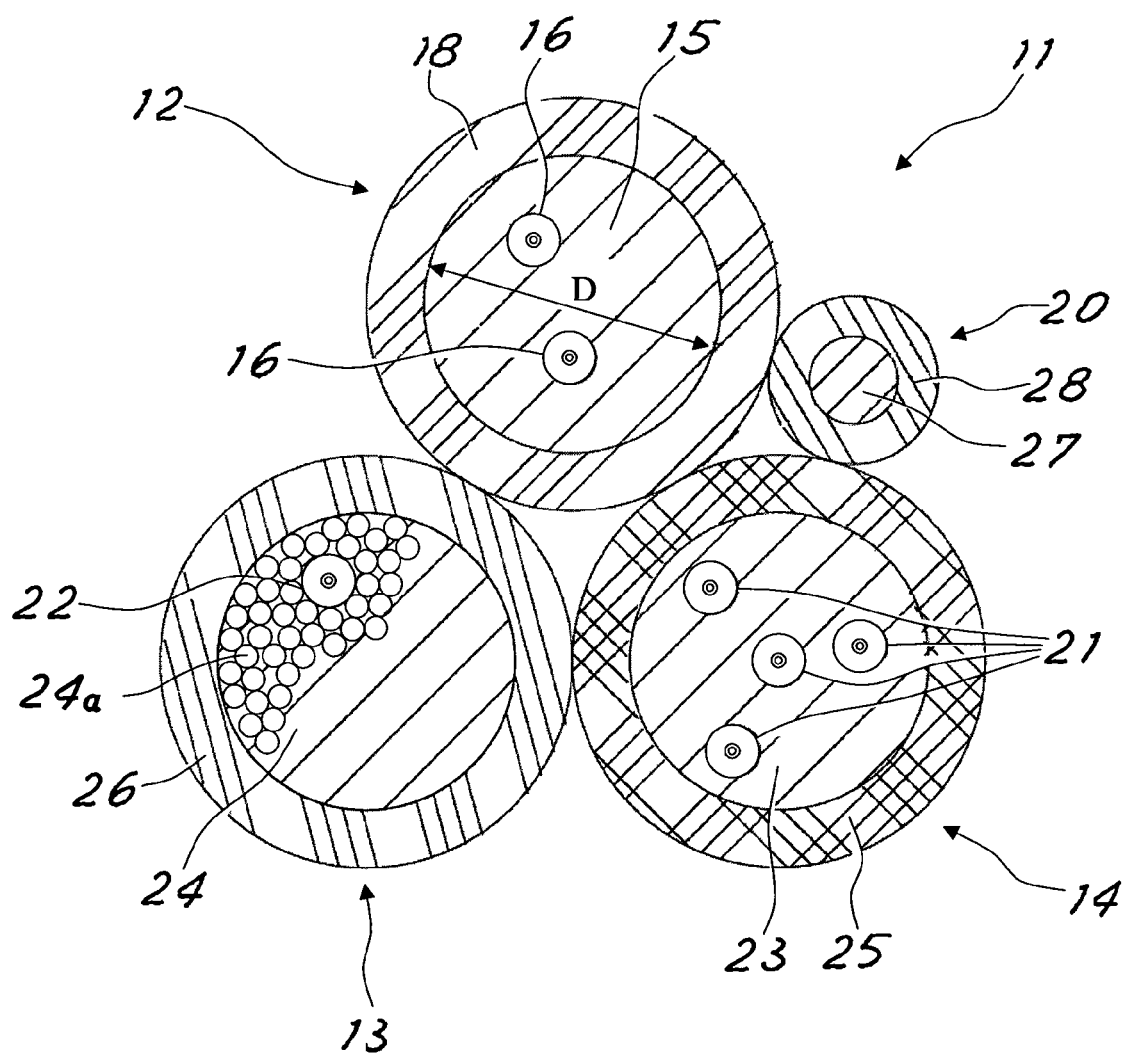

HYBRID CABLE

CROSS REFERENCE TO RELATED APPLICATION

This application is a national phase application based on PCT/IB2007/003280, filed Oct. 18, 2007, the content of which is incorporated herein by reference.

BACKGROUND OF THE INVENTION

1. Field of the Invention

The present invention relates to a hybrid cable, comprising both electrical conductor wires for power transmission and optical fibres for data transmission. Particularly, the hybrid cable according to the invention is intended for use in a building. More particularly, the hybrid cable according to the present invention is a low voltage (LV) cable.

2. Description of the Prior Art

Raceways are usually provided in a building for power cables installation, said cables distributing power (i.e. electrical energy) to each apartment of the building.

Typically, the power cables run from the power meters—located at the base of the building—to a switchboard present in each apartment of the building.

In the case an optical fibre cable is needed for allowing telecommunication data to be transmitted to an end user living in a given apartment, additional raceways are provided for receiving the optical fibre cables to be installed. Additional raceways are often needed since the size of the raceways already present in the building—and used for housing the power cables—may not allow an optical fibre cable to be installed together with a power cable within the same raceway. Alternatively, raceways of greater sizes are needed to replace the already installed raceways in case the installation of optical fibre cables cannot be performed together with the already installed power cables within the same raceway.

However, drawbacks arise when further additional raceways or raceways of greater size have to be installed for receiving the optical fibre cables. For instance, masonry work is generally required to be made in the building/apartments, thereby remarkably increasing the installation costs. Moreover, in the case masonry work has to be carried out in the building, at least the majority of the building lodgers must agree on the works to be done.

Whenever an optical fibre is included in a cable, the optical fibre requires to be protected from axial and radial stresses, such as those which typically occur onto a cable which is installed within a building raceway. These stresses are due, for example, to the pulling force acting onto the cable during installation thereof, said pulling force giving origin both to axial traction forces and to radial compression forces, whenever the installation path comprises curvilinear portions in combination with rectilinear portions.

The above mentioned stresses are particularly deleterious to the optical fibres as they can cause attenuation phenomena of the transmitted signal, or can even break or seriously damage the optical fibre during installation of the cable.

The optical fibre can be protected by providing the cable with additional protecting elements. However, such a technical solution would be more complex and, moreover, it would cause the cable size to grow to an unacceptable extent, especially in view of the fact that this cable is requested to be installed in a raceway of limited dimensions (and already present in the building structure).

WO 2005/114285 relates to wireline cables having optical fibre(s) used in conjunction with metallic conductors and to the use thereof, in particular for oilfield applications. This document discloses that placing the optical fibres in specific positions and areas of the cable creates a wide variety of means to monitor well bore activity and conditions. For instance, when the optical fibre is placed in a helical position inside the cable (e.g. optical fibres are helically positioned around a central metallic conductor), measurements of downhole physical properties (e.g. temperature or pressure) can be quickly acquired. Conversely, placing the optical fibre in a central position upon the center axis of the cable—a plurality of metallic conductors being helically positioned around the optical fibre—allows for strain measurements. The reciprocal position of electrical conductors and of optical fibre does not vary along the cable.

The cable disclosed by document WO 2005/114285 is not suitable for installation along tortuous and indefinite paths, as may be required when placing the cable in the raceways of a building. In fact, along a bend in the cable path, for instance, the optical fibre of the cable according to document WO 2005/114285 would tend to maintain its cross-sectional position with respect to the conductor wires, thus undergoing relevant axial/radial stresses which would likely cause an unacceptable deterioration of the data transmission property.

SUMMARY OF THE INVENTION

The Applicant has found that the installation extra costs—due to the additional or bigger raceways—could be advantageously avoided by replacing the power cables—already installed in the building raceways—with hybrid cables that carry both power and telecommunication data. Moreover, in the case both power transmission and data transmission have to be provided to a new building, the Applicant has found that this objective can be successfully achieved at moderate prices by providing a flexible hybrid cable comprising at least one optical fibre unit and a plurality of conductor wires wherein the optical fibre unit is dispersed within conductor wires as better described in the following.

It is an aim of the present invention to provide an optical link in a building by using a hybrid cable adapt to withstand the mechanical axial and radial stresses which, for instance, may occur during installation in a building raceway, maintaining a satisfactory data transmission property through the optical fibre.

Within the present description, by the term "cable" it is meant a conductor with its insulation; when a three-phase cable is referred to, it is meant an assembly formed by three or more cables assembled together (usually stranded), to convey three phase electric power. In such case, each cable of the three-phase cable is usually referred to as phase cable.

Another object of the invention is to provide a hybrid cable having a relatively limited diameter, which can suitably replace the power cables already installed in the raceway of a building or which can be suitably installed in the raceway of a new building.

In accordance with the invention, it is provided a hybrid cable comprising a plurality of electrically conductor wires, at least one optical fibre unit and an insulation jacket surrounding the conductor wires and the optical fibre unit, characterized in that the at least one optical fibre unit is dispersed in a number of conductor wires which is at least 12 times the number of the optical fibre units, the diameter of the optical fibre unit being substantially equal to or greater than the diameter of the conductor wires.

The Applicant has found that by dispersing the at least one optical fibre unit within a plurality of filaments (or wires) forming the cable electrical conductor, the resulting hybrid cable—which electrically connects the user's power meter (typically housed in a suitable space at the base of the building) to a switchboard located inside the user's apartment—can be installed into a building raceway or can replace the originally installed power cable in an already existing building raceway by providing sufficient protection to the optical fibre unit so as to prevent its damaging or reduction in the optical transmission capability.

In order to minimize the mechanical stress on it, the optical fibre unit is dispersed in a plurality of conductor wires having diameter equal to or smaller than the diameter of the optical fibre unit, wherein the number of conductor wires is considerably higher than the number of optical fibre units, at least 12 times the number of the optical fibre units. This arrangement allows the optical fibre unit to re-arrange its position within the filaments of the electrical conductor during installation, thus reaching a low energy configuration and minimizing the stresses on the optical fibre unit.

According to the present description and to the claims associated thereto, the term "optical fibre unit" indicates the optical assembly within the hybrid cable, said optical assembly being formed of at least one optical fibre.

Preferably, the diameter of the optical fibre unit is at least twice the diameter of each conductor filament (or wire). Advantageously, the optical fibre unit is a tight buffer fibre, i.e. a fibre having a tight buffer coating surrounding the coated glass fibre.

By dispersing the optical fibre unit among the conductor wires according to the present invention, the conductor wires are the ones which withstand the axial tensile stresses occurring onto the hybrid cable during pulling thereof. Moreover, the conductor wires create a suitable protection for the tight buffer optical fibre unit with respect to the compression forces which act transversally (radially) onto the hybrid cable during installation thereof.

In particular, the Applicant has found that, when the tight buffer optical fibre unit is inserted among the wires of a conductor of a low voltage power, cable of flexible type, said flexible cable having wires of diameter corresponding to the requirements of Class 5 according to Standard IEC 60228—3rd Edition—2004-11, the conductor wires provide a mechanical protection around the optical fibre unit without forcing the fibre(s) in a pre-fixed position, thereby protecting the fibre(s) from axial and radial stresses acting thereupon.

The present embodiment is particularly satisfactory when the optical fibre unit is of the tight buffer type, and thus has a reduced diameter (e.g. 900 μm) compared with a "loose buffer" optical fibre unit. A "loose buffer" optical fibre unit is an assembly according to which a tubular element contains one or more optical fibre(s) with an outer diameter of few millimetres. A "loose buffer" optical fibre unit arranged within a power cable provides a protection to the optical fibre(s), but increases the cable diameter and, as a consequence, it decreases the cable overall flexibility. Preferably, the conductor wires of the hybrid cable are in a number from about 16 to about 3300, more preferably from about 24 to about 1800, even more preferably from about 72 to about 238, depending on the desired conductor cross section and chosen wires diameters.

In the case an already existing power cable has to be replaced, in order to allow an easy installation, the hybrid cable is requested to have a cross-sectional size substantially equal to or very close to that of the power cable previously installed. Therefore, the power cable already present in the building raceway can be uninstalled and replaced with the hybrid cable of the present invention which carries both power and telecommunication data, this operation being less expensive than making the masonry work which is necessary for installing an optical fibre cable in new additional or bigger raceways.

BRIEF DESCRIPTION OF THE DRAWING

For better explaining the innovative principles of the present invention and the advantages it offers over the known art, a possible embodiment applying said principles will be described hereinafter by way of example, with the aid of the accompanying drawing.

The drawing illustrates a view of a cross-section of a hybrid three-phase cable of the present invention.

DETAILED DESCRIPTION OF THE INVENTION

FIG. 1 shows a cross section view of a hybrid three-phase cable 11, which comprises three hybrid phase cables 12-14 according to the present invention. The hybrid cable 11 of FIG. 1 also includes an additional insulated electrical conductor 20 for operation of the cable during the night period, said additional insulated electrical conductor 20 comprising a conductor core 27 and an insulation layer 28. The hybrid cable 11 is a low voltage cable which is suitable for power distribution and data transmission within a building.

Within the present invention, by "low voltage" cable it is meant a cable designed to operate at a voltage less than 1 kV.

Each phase cable 12-14 comprises a plurality of electrically conductor wires, an optical fibre unit comprising at least one optical fibre and an insulation jacket surrounding the conductor wires and the optical fibre unit.

Particularly, the phase cable 12 comprises a conductor 15, two optical fibre units 16 and an insulating outer jacket 18; phase cable 13 comprises a conductor 24, one optical fibre unit 22 and an outer jacket 26; phase cable 14 includes a conductor 23, four optical fibre units 21 and an insulating outer jacket 25.

In the drawing, the conductors 15, 23 and 24 are represented as a hatched area. In detail, said conductors are formed by a plurality of flexible wires, preferably copper wires, all having a very small diameter, as shown in part for conductor 24 where some wires 24a are represented around the optical fibre unit 22.

Preferably, the optical fibre units 16, 21, 22 are tight buffer optical fibre units, i.e. optical fibres having a protective buffer coating which surrounds tightly the internal coated optical fibre. This allows the overall dimension of the hybrid cable to be reduced with respect to a cable provided with "loose buffer" optical fibre units, wherein one or more coated optical fibre is loosely contained in a buffer protection tube.

The number of conductor wires in each phase cable is at least 12 times the number of the optical fibre units contained within the same phase cable. Preferably, the number of conductor wires is at least 18 times higher than the number of the optical fibre units. The number of conductor wires is advantageously in the range between 16 and 3300, more preferably 72 and 238. The number of optical fibre units in each phase cable is preferably in the range between 1 and 4.

The diameter of the optical fibre units is substantially equal to or greater than the diameter of the conductor wires. Advantageously, the diameter of the optical fibre units is between 1 and 5 times the diameter of the conductor wires. Most preferably, the diameter of the optical fibre units is at least twice the diameter of the conductor wires.

The diameter of the optical fibre units is preferably between 0.6 mm and 1 mm.

In order to obtain a flexible cable the conductors have diameters corresponding to the requirements of Class 5 according to Standard IEC 60228—3rd Edition—2004-11. The diameter of the conductor wires is preferably between 0.1 mm and 0.6 mm.

Preferably, the conductor wires and the optical fibre units are twisted together to form a bundle of wires and optical fibre units having stranding pitch at least 10 times greater than the diameter "D" (see FIG. 1) of the bundle formed by said wires and said optical fibre units. Preferably, said stranding pitch is between 70 mm and 130 mm.

According to the present invention, as mentioned above, each optical fibre unit is dispersed in a much higher number of conductor wires whose diameter is equal to or smaller than the diameter of the optical fibre unit. This, preferably in combination with the relatively long stranding pitch, allows the optical fibre unit to move with respect to the conductor wires during installation, so that the optical fibre units can find the most suitable position along the cable (with a low energy configuration), sliding inside the matrix of the small conductor wires. In this way, the optical fibre unit has not a fixed position in each cross section along the cable and it is always positioned in such a way to minimize the radial and axial stresses on it, even in case the cable is laid along a tortuous path. This particular arrangement makes it possible to obtain satisfactory data transmission property of the optical fibre unit, meanwhile maintaining relatively low diameter of the hybrid cable.

Here follows a practical example of a hybrid cable according to the invention.

EXAMPLE

A three-phase hybrid cable was manufactured, each hybrid phase cable having a cross-section area of 16 mm$^2$ and being formed of 108 copper wires (having a diameter of 0.408 mm) and one optical fibre unit (having diameter of 0.9 mm).

The optical fibre unit is a tight buffer optical fibre unit, including a single mode or a multi mode optical fibre having a diameter of about 0.25 mm, said optical fibre being coated with a tight polymeric buffer coating (e.g. made from polyamide).

The wires and the optical fibre unit were bundled together with a stranding pitch of 101 mm. The diameter "D" of the bundle of wires and optical fibre unit, shown in FIG. 1, was of about 5.17 mm. The overall diameter of the phase cable, including the thickness of the insulating layer, was 7.17 mm.

The hybrid cable also comprised an additional insulated electrical conductor for operation of the cable during the night period when the power request is sensibly lower than during the day. Said additional insulated electrical conductor had a cross-sectional area of 1.5 mm$^2$ and was formed of 24 copper wires having a diameter of 0.259 mm. The copper wires were coated with an insulation layer having a thickness of about 0.7 mm.

Each phase cable was manufactured by forming, at first, 9 groups each consisting of 12 parallel wires and then stranding them together, the optical fibre unit being inserted in one group of wires in parallel with the other wires of the group. The assembly was then coated with an insulating layer to form a cable core or cable phase. Three hybrid phase cables were grouped with the additional insulated electrical conductor, as shown in FIG. 1.

The hybrid cable was tested under different conditions of mechanical stress and temperature stress, maintaining satisfactory data transmission property.

In detail, the measured attenuation coefficient was 0.21 dB/Km at 1550 nm and 0.23 dB/Km at 1625 nm, thus complying with a required level of 0.5 dB/Km at 1550 nm, according to Standard IEC 60793 (Edition 5, 10-2003).

The hybrid cable was then tested under traction stress by applying a load from 0 to 500 Kg to a cable length of 32 m. Satisfactorily, it was found that the variation in the attenuation was only 0.05 dB/Km, complying with a required maximum attenuation increase of 0.2 dB/Km at 100 Kg of traction according to Standard IEC 60794-1-2 (Edition 2, 5-2003).

The cable was also tested under alternate flexion by using a testing machine having a fixed pulley with a diameter of 20 cm and a movable pulley with a diameter of 48 cm. The weight applied to the cable on each side was 26 Kg. The cable underwent 1.000 flexion cycles, with a rate of 380 cycles/hour. Satisfactorily, it was found that the increase of the attenuation was less than 0.025 dB, which is below a required maximum attenuation increase of 0.2 dB according to Standard IEC 60794-1-2 (Edition 2, 5-2003).

The hybrid cable was also tested to repeated bending by using a testing machine having a mandrel diameter of 120 mm. The cable underwent 100 cycles with bending of 90°. After the test, it was satisfactorily found that the attenuation was below 0.05 dB (lower than the required level of 0.2 dB) according to Standard IEC 60794-1-2 (Edition 2, 5-2003). No damages to the cable were observed.

The cable was also tested under compression by using two compression plates of 10 cm in length and a load varying from 0 to 1000 Kg, increasing step by step 200 kg each time and waiting 4 minutes each step. The increase of the attenuation was less that 0.05 dB, which is well below the required level of 0.2 dB according to Standard IEC 60794-1-2 (Edition 2, 5-2003). No damages to the cable were observed.

The cable was also tested under impacts by applying a series of 5 impact of 9.8 J with an impact surface having radius of 10 mm. The attenuation increase was lower than 0.04 dB, which is well below the required level of 0.2 dB according to Standard IEC 60794-1-2 (Edition 2, 5-2003). No damages were observed on the cable.

Lastly, the cable was tested under thermal stress. A cable coil of 1300 m was placed in a climatic chamber where the temperature was brought to −30° C. for 5 hours and then +70° C. for 5 hours, repeating this cycle twice. The variation of attenuation was measured every minute, both at 1550 nm and at 1310 nm. It was satisfactorily found that the maximum variation of attenuation was lower than 0.01 dB/Km at both wavelengths. This result was within the required level of 0.2 dB/Km according to Standard IEC 60794-1-2 (Edition 2, 5-2003). No damages to the cable were observed.

The hybrid cable according to the present invention can be dimensioned in different ways. For example, a 10 mm$^2$ cable conductor can be formed of 69 electrical conductor wires having diameter of 0.408 mm and one optical fibre unit having diameter of 0.9 mm. The stranding pitch of the bundle of wires and optical fibre unit is 95 mm.

A further example is a 25 mm$^2$ cable conductor which is formed of 168 conductor wires having diameter of 0.408 mm and one (or more, up to 4) optical fibre unit having diameter of 0.9 mm. The stranding pitch of the bundle of wires and optical fibre unit is 120 mm.

Even if the three phase cable of the example has been shown having one or more optical fibre units in each of the phase cables, a typical application comprises one or two optical fibre units in one phase cable only, as is usually sufficient to optically connect one user.

Even if a preferred way of replacing the traditional cable with the hybrid cable of the invention comprises extracting the three phase cable in place in the building and replacing with the hybrid three phase cable, it can also be possible to extract a single phase cable (in case the phase cables are not stranded together) and replace such extracted phase cable with a hybrid phase cable according to the invention.

The preferred use of the above described cables (10 mm², 16 mm² and 25 mm²) is between the room where the power meters are placed in a building (the room which normally is at the bottom of the building) and each individual flat of the building.

However, even smaller cable can be made according to the invention, for example 0.50 mm² (16 conductor wires), 0.75 mm² (24 wires), 1 mm² (29 wires), for the distribution of power and the transmission of data within each flat of the building. Preferably, the wires and the optical fibre units of these smaller cables are not stranded.

It is now clear how the cable according to the present invention achieves the above mentioned aims. Particularly, the size of the cable is such that the cable can be inserted in the raceways typically used for power cables, thus allowing to distribute power and data without requiring special masonry work to be done and further raceways for the optical fibre units to be installed, thereby replacing the existing power cables inside a raceway with a hybrid cable of the present invention which is installed within the already existing raceway.

Moreover, the hybrid cable according to the invention is capable to withstand the mechanical radial and axial stresses (arising for example during an installation along a tortuous path) maintaining a satisfactory data transmission property through the optical fibre(s) of the optical fibre unit.

The above description of embodiments applying the innovative principles of the present invention is to be taken by way of example only and is not anyhow limiting the scope of protection hereby claimed.

The invention claimed is:

1. A hybrid cable comprising:
    an electrical conductor comprising a plurality of conductor wires, the conductor wires being copper filaments;
    at least one optical fibre unit comprising at least one optical fibre, the at least one optical fibre unit being dispersed among the copper filaments; and
    an insulation jacket surrounding the electrical conductor and the at least one optical fibre unit,
    wherein
    the number of the copper filaments is at least 12 times the number of the at least one optical fibre unit,
    the diameter of the at least one optical fibre unit is between 1 and 5 times the diameter of one copper filament, and
    the copper filaments and the at least one optical fibre unit are stranded together to form a bundle, a stranding pitch of the bundle being at least 5 times greater than the diameter of the bundle.

2. The hybrid cable according to claim 1, wherein the diameter of the at least one optical fibre unit is between 2 and 5 times the diameter of one copper filament.

3. The hybrid cable according to claim 1, wherein the number of copper filaments is at least 18 times the number of the at least one optical fibre unit.

4. The hybrid cable according to claim 1, wherein the diameter of the at least one optical fibre unit is between 0.6 mm and 1 mm.

5. The hybrid cable according to claim 1, wherein the diameter of one copper filament is between 0.1 mm and 0.6 mm.

6. The hybrid cable according to claim 1, wherein the number of copper filaments is between 16 and 3300.

7. The hybrid cable according to claim 6, wherein the number of copper filaments is between 72 and 238.

8. The hybrid cable according to claim 1, wherein the number of the at least one optical fibre unit in the cable is between 1 and 4.

9. The hybrid cable according to claim 1, wherein the stranding pitch of the bundle is between 70 mm and 130 mm.

10. The hybrid cable according to claim 1, wherein the at least one optical fibre unit is a tight buffer optical fibre unit.

11. The hybrid cable according to claim 1, comprising a low voltage cable.

12. A hybrid three-phase cable comprising three phase cables and at least one phase cable comprising the hybrid cable according to claim 1.

13. A method for carrying out an electrical-optical wiring of a building having electrical wiring comprising at least one electrical cable installed in a respective raceway of the building, comprising:
    uninstalling the electrical cable from the raceway; and
    installing, in the raceway, a hybrid cable having substantially the same diameter of the electrical cable previously installed in the raceway, the hybrid cable comprising:
        an electrical conductor comprising a plurality of conductor wires, the conductor wires being copper filaments;
        at least one optical fibre unit comprising at least one optical fibre, the at least one optical fibre unit being dispersed among the copper filaments; and
        an insulation jacket surrounding the electrical conductor and the at least one optical fibre unit,
        wherein
            the number of the copper filaments is at least 12 times the number of the at least one optical fibre unit,
            the diameter of the at least one optical fibre unit is between 1 and 5 times the diameter of one copper filament, and
            the copper filaments and the at least one optical fibre unit are stranded together to form a bundle, a stranding pitch of the bundle being at least 5 times greater than the diameter of the bundle.

* * * * *